United States Patent
Schumacher et al.

(10) Patent No.: US 8,988,084 B2
(45) Date of Patent: Mar. 24, 2015

(54) DEVICE AND METHOD FOR MONITORING AT LEAST ONE ENERGY RESERVE CAPACITOR IN A RESTRAINT SYSTEM

(75) Inventors: Hartmut Schumacher, Freiberg (DE); Gernod Heilmann, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 1440 days.

(21) Appl. No.: 10/555,128

(22) PCT Filed: Mar. 2, 2004

(86) PCT No.: PCT/DE2004/000400
§ 371 (c)(1),
(2), (4) Date: Oct. 12, 2006

(87) PCT Pub. No.: WO2004/096613
PCT Pub. Date: Nov. 11, 2004

(65) Prior Publication Data
US 2007/0030016 A1    Feb. 8, 2007

(30) Foreign Application Priority Data
Apr. 30, 2003  (DE) .................................. 103 19 336

(51) Int. Cl.
G01R 27/26 (2006.01)
B60R 21/017 (2006.01)

(52) U.S. Cl.
CPC .................................. *B60R 21/0173* (2013.01)
USPC ........................................................ 324/678

(58) Field of Classification Search
None
See application file for complete search history.

(56) References Cited

U.S. PATENT DOCUMENTS

| | | | | |
|---|---|---|---|---|
| 3,665,570 A * | 5/1972 | Brooks | ......................... | 29/25.42 |
| 3,786,458 A * | 1/1974 | Horner et al. | ............ | 340/870.32 |
| 3,870,894 A * | 3/1975 | Brede et al. | ..................... | 307/9.1 |
| 4,521,678 A * | 6/1985 | Winter | ..................... | 235/462.25 |
| 5,204,547 A * | 4/1993 | Schumacher et al. | ........ | 307/10.1 |
| 5,501,486 A * | 3/1996 | Fujita et al. | ..................... | 280/735 |
| 5,624,132 A * | 4/1997 | Blackburn et al. | ............ | 280/735 |
| 5,880,589 A * | 3/1999 | Okano | ......................... | 324/548 |
| 6,038,607 A | 3/2000 | Hamilton et al. | | |
| 6,205,383 B1 * | 3/2001 | Hermann | ......................... | 701/45 |
| 6,512,308 B2 * | 1/2003 | Boezen et al. | ............... | 307/10.1 |
| 7,155,353 B2 * | 12/2006 | Okamoto et al. | ............... | 702/65 |
| 7,642,747 B2 * | 1/2010 | Morioka et al. | ............... | 320/112 |
| 2004/0170195 A1 | 9/2004 | Slivkoff et al. | | |

FOREIGN PATENT DOCUMENTS

| | | |
|---|---|---|
| DE | 197 09 234 | 9/1997 |
| DE | 197 15 571 | 3/1999 |
| DE | 200 05 783 | 8/2001 |
| DE | 101 18 299 | 11/2002 |
| EP | 1622795 | 2/2008 |
| JP | 8336233 | 12/1996 |
| WO | WO 2004/096613 | 11/2004 |

OTHER PUBLICATIONS

Inventor (Erfinder) not listed, "English—Machine Translation of DE20005783U" German patent listed on IDS PTO 1449.*
Fendt, Gunter, "Machine Translation of DE10118299" German patent listed on IDS PTO 1449.*
Fendt, Guenter. PTO Translation of DE10118299, Apr. 2008.*
Not Named. PTO Translation of DE20005783, Apr. 2008.*

* cited by examiner

*Primary Examiner* — Thomas F Valone
(74) *Attorney, Agent, or Firm* — Kenyon & Kenyon LLP

(57) ABSTRACT

A method and a device are provided for monitoring an energy reserve capacitor, in which monitoring of the internal resistance is provided in addition to monitoring of the capacitance. This is achieved by a time sequence of charging operations and an interruption of those charging operations.

14 Claims, 5 Drawing Sheets

DEVICE AND METHOD FOR MONITORING AT LEAST ONE ENERGY RESERVE CAPACITOR IN A RESTRAINT SYSTEM

FIELD OF THE INVENTION

The present invention relates to a method and a device for monitoring at least one energy reserve capacitor in a restraint system.

BACKGROUND INFORMATION

German Patent Application No. 197 15 571 describes, for example, monitoring the capacitance of a capacitor used as an energy reserve for a restraint system.

SUMMARY

A method and device according to an example embodiment of the present invention for monitoring an energy reserve capacitor may have the advantage that the internal resistance of the energy reserve capacitor is also monitored. Aging of aluminum electrolytic capacitors, which are in most cases used as energy reserve capacitors, is accompanied by a change in capacitance and in internal resistance as well. As the number of firing circuits, which, increasingly frequently, have to be fired in parallel and at high current, increases, existing solutions for energy reserve voltage and vehicle battery voltage become less effective since it is not possible for enough current to be adequately provided over a cable connection of 0.5 to 1 ohm internal resistance without appreciable voltage drop. For that reason, it is becoming increasingly important to monitor the internal resistance of the energy reserve capacitors separately as well as monitoring the capacitance thereof. Only in that way is it possible to ensure in the worst case that simultaneous parallel firing at high firing speed and high firing current is able to take place, especially in the case of firing circuits having a relatively high circuit resistance, for example 6.5 ohm. That also ensures that, when the energy store is used at the same time to supply control units, the high current drain of up to 20 amperes during firing does not cause a temporary drop in the energy reserve voltage to below the reset threshold of the voltage supply, which would result in failure of the entire system in the event of a crash. If a fault, for example an unduly high internal resistance, is detected, it will be indicated so that the control unit with that energy reserve may be replaced, since this is only necessary to ensure reliable operation of a restraint device in the event of it being triggered.

In the electronics for restraint systems, especially in the control unit, an energy reserve for which either one or more capacitors are used is currently used for firing the restraint device. Thus, the firing of the restraint device is independent of fluctuations in and the state of the battery voltage in the vehicle. The device and method according to the present invention may be applied both in the case of one energy reserve capacitor and in the case of a plurality of energy reserve capacitors.

It may be especially advantageous if the device determines the internal resistance of the energy reserve capacitor by a time sequence of at least one charging operation and an interruption of that operation. It is thereby possible to ascertain defined electrical parameters that are influenced by the internal resistance. Consequently, it is then thereby possible to determine the internal resistance using the microcontroller in the control unit. If a number of charging and discharging operations are used, the measurement is more robust.

It may also be advantageous if a voltage converter, a rectifier and a voltage divider are provided for monitoring the internal resistance. The voltage converter serves to charge the at least one energy reserve capacitor, and the rectifier and voltage divider connected downstream of the energy reserve capacitor serve to measure the electrical parameters used to determine the internal resistance of the energy reserve capacitor. The rectifier should be a peak rectifier, while the voltage divider is additionally configured as a low-pass filter. That prevents short-term voltage peaks from having an effect on the measurement. The voltage converter preferably has a regulator for its output voltage in order to keep the output voltage in a defined control band after a charging phase of the energy reserve capacitor.

The method for determining the internal resistance of the energy reserve capacitor may proceed as follows:

In a first step, the capacitor is charged by the voltage converter to a first voltage value which is above the battery voltage. This is necessary in order for the measurement to be performed above the battery voltage, since it may be that the battery voltage is coupled to the energy reserve capacitor directly as a reserve and thus might falsify the measurement. If, however, the energy reserve capacitor is charged to above the battery voltage, the measurement is independent of the behavior of the battery voltage. To provide defined starting conditions, the converter is switched off and an abrupt drop in voltage occurs across the internal resistance of the electrolytic capacitor. That voltage then, however, falls across another component in the circuit. The capacitor of the peak rectifier, on the one hand, and the voltage divider which is connected downstream of the peak rectifier are used for that purpose. That behavior does not occur instantaneously, however, but occurs with a certain delay, and therefore a certain waiting period is observed until a static value is obtained. That period is generally determined by the decay of energy in the coil of the switching converter, the time constants of the peak rectifier, the measuring low-pass filter and any load currents at the output of the peak rectifier. The value of the voltage that falls across the internal resistance of the energy reserve capacitor at the switch-off time is given by the value of the internal resistance and the charging current at that time, the charging current having been delivered to the capacitor. After that waiting period until a static value has been obtained, the energy reserve capacitor is again charged by the converter. The state of charge of the energy reserve capacitor remains virtually unchanged by the change in the time perspective, whereas the voltage across the energy reserve capacitor pulsates in the time of the switching converter. The voltage ux at the output of the peak rectifier assumes the peak value of the pulsating voltage. The converter is then switched off again until a static value has been obtained. As explained above, the internal resistance of the energy reserve capacitor may be determined from the difference between the charged value and the static, fallen value of the peak rectifier.

The period for which the converter is switched off is selected in dependence on the residual coil energy, the time constants of the peak rectifier, the measuring low-pass filter and any load currents at the output of the peak rectifier. The charging period in the second charging operation is selected in such a manner that the capacitance of the peak rectifier is increased to the peak value which is by the second voltage at the internal resistance of the energy reserve capacitor, which is caused by the clocked charging current, plus the voltage at the actual capacitance. The method according to the present invention is preferably carried out at cold start since the vehicle is in its coldest state with regard to the electrolytic capacitor.

The voltage converter charges the energy reserve capacitor in a clocked manner. For determining the internal resistance of the energy reserve capacitor a switching converter operation of known pulse train amplitude is required in order to determine the internal resistance of the energy reserve capacitor from the observed voltage difference between peak value, when the converter is active, and fallen value, when the converter is inactive. Switching converter operation may be necessary since the voltage applied to the energy reserve and hence the entire measuring procedure is above the voltage of the vehicle battery. The clocked step-up converter used here determines the peak value of the coil current in the transverse branch of the converter.

A development of the present invention provides for a series transistor to be provided in the voltage converter. That series transistor makes it possible to control the passage of the battery voltage to the energy reserve capacitor. This reduces the power loss during measurement, since measuring may be carried out at a lower voltage. Furthermore, by blocking the series transistor during the measurement, it is possible to eliminate the effect of the battery voltage on the measurement.

BRIEF DESCRIPTION OF THE DRAWINGS

Exemplary embodiments of the present invention are shown in the figures, and are described in detail below.

DETAILED DESCRIPTION OF EXAMPLE EMBODIMENTS

Figure 1:
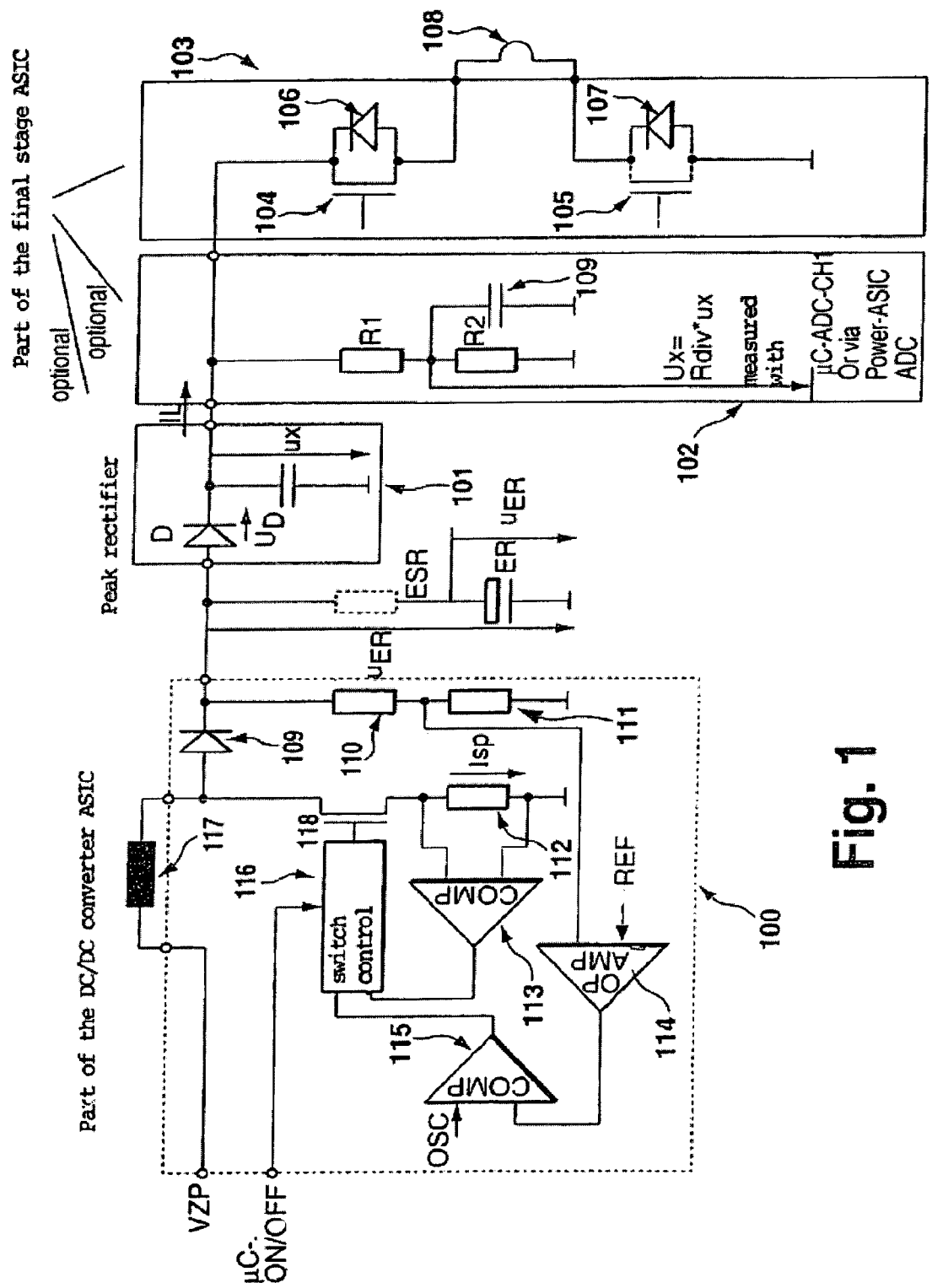
FIG. 1 is a first circuit diagram of the device according to an example embodiment of the present invention.

A description is provided below of how, as the internal resistance of the energy reserve capacitor increases, the restraint system reacts correctly by indicating a dangerously high internal resistance when it occurs, in order to obtain replacement of the electronics. The signal may, for example, be given to the driver visually on the instrument panel by a display, an audible indication may be given or it is also possible, in addition, for contact to be made via a transmitting/receiving station, for example a mobile telephone, in order to contact a garage or other service establishment. The latter would then be able to inform the driver that replacement is necessary.

In order for the device according to the present invention to be operated or implemented, the following conditions should be met:

A clocked step-up converter of fixed or variable switching converter frequency is to be provided. The charging voltage of the energy reserve capacitor is ultimately above the highest airbag system supply voltage. In that way, measurement is carried out in a range that is not subject to interference by other variables. In the following, a converter having a coil is presented. The converter features measurement of the coil current in the transverse branch so as to switch to the longitudinal branch after the maximum permissible coil current has been reached. The maximum coil current in clocked charging operation of the energy reserve should be between 0.4 and 1.2 A. That value range is typical for charging even large energy reserves of up to 20 mF to 33±2 volts in times of <10 seconds in medium-sized to relatively large airbag systems. If that is the case, it is possible for internal resistances of the energy reserve capacitor to be resolved with a resolution of from 32 to 96 mΩ. Larger coil currents with further improved resolution of the measurement of the internal resistance are, of course, also possible.

The converter is capable of being switched on and off by a processor or microcontroller of the airbag control unit. A peak rectifier formed by a diode and, for example, a ceramic capacitor is connected downstream of the energy reserve. The diode and the ceramic capacitor do not represent new parts in optimally configured airbag systems but, rather, are already present as a general rule for connecting the final stages of restraint systems to the energy reserve. That is to say, that peak rectifier is present in any case. The voltage of the peak rectifier of the energy reserve capacitor is divided by a voltage divider, which either is arranged discretely between diode and ground or is integrated in an integrated circuit, for example in the final stage IC, and is connected as a low-pass filter. The low-pass filter is either formed by a discrete ceramic element between the two partial resistors and ground, or the low-pass filter is formed by correspondingly connecting an operational amplifier for measuring the divider voltage, for example integrated in the final stage ICs. The voltage of the peak rectifier is furthermore measurable by an analog-digital converter. The analog-digital converter is either a component part of the microcontroller or a component part of a switching converter IC that is in serial or parallel connection with the microcontroller via a digital communication connection, or it is a component part of the final stage IC and is in serial or parallel connection with the microcontroller via a digital communication connection.

Figure 4:
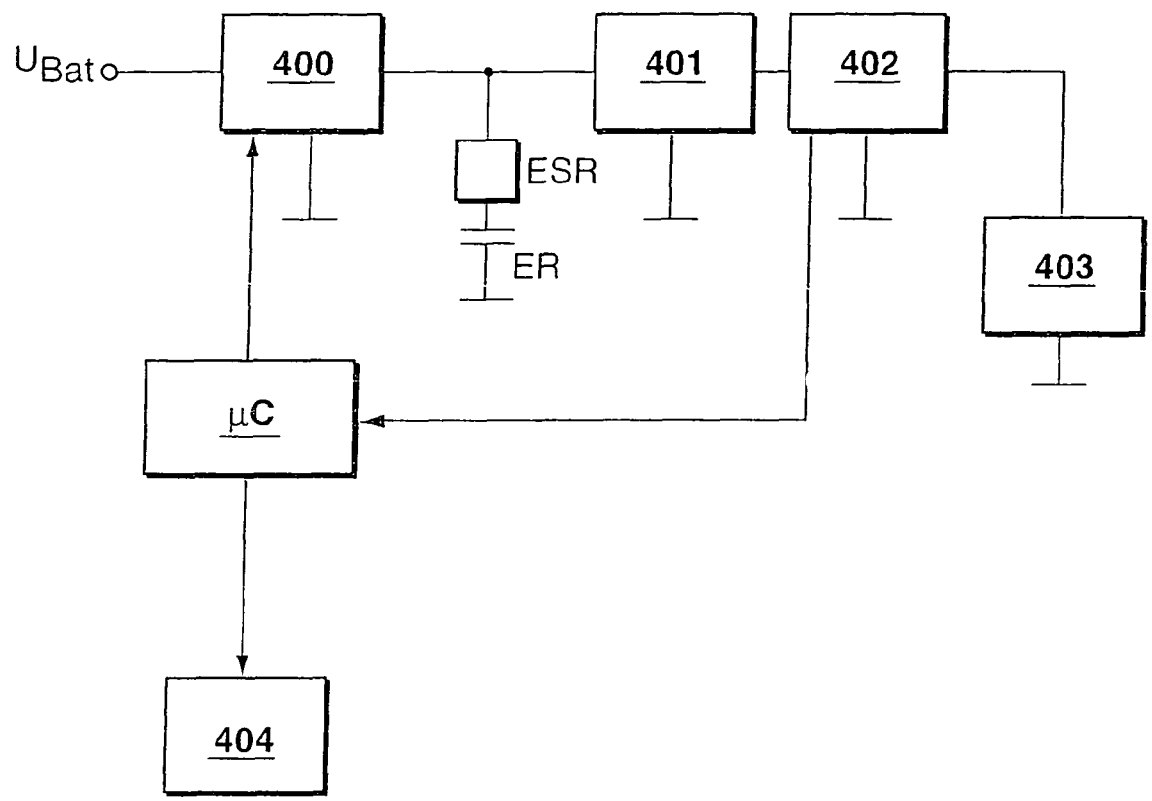
FIG. 4 is a block diagram of the device according to an example embodiment of the present invention.

In FIG. 4, an overview of the device according to an example embodiment of the present invention is shown in a block diagram. A voltage converter 400 transforms the battery voltage $U_{Bat}$ to a higher value with which a downstream energy reserve capacitor ER is charged. That energy reserve capacitor has an internal resistance ESR through which the charging current of the voltage converter 400 passes. Connected downstream of the energy reserve capacitor ER is a rectifier 401. That rectifier prevents unintentional firing by an unintended positive voltage pulse in the downstream firing device 403 or the terminals of the firing element since, without that rectifier 401, the firing element would be connected to the energy reserve via the backward diodes of the final stage transistors and would therefore conduct current in the event of a potential difference. Connected in parallel between the rectifier 401 and the firing device 403 is a voltage divider 402 which is also configured as a low-pass filter. The voltage divider 402 is used to measure the internal resistance ESR as described below. The voltage measured at the voltage divider 402 is fed to microcontroller μC, more specifically directly into its analog-digital converter. Depending on the value of the internal resistance ESR of the energy reserve capacitor ER thus determined, microcontroller μC activates an indicator 404 which indicates whether the internal resistance ESR has such a high value that replacement of the airbag control unit in which the energy reserve capacitor ER is situated is necessary. That indicator 404 may be a light on the instrument panel, a display on a screen, a spoken announcement or a message transmitted by radio to a service provider.

FIG. 1 shows the device according to an example embodiment of the invention in detail in a circuit diagram. In block 100, the voltage converter is shown. A coil 117 is arranged outside block 100 since all the components in block 100 are integrated in an IC. It is not possible for coil 117, which is in the form of a pot coil, to be integrated in the IC. Coil 117 is connected on one side to the battery voltage $U_{Bat}$, or to the polarity-inversion-protected battery voltage VZP, and on the other side to the anode of a diode 109 and, for example, to the drain of a transistor 118. The gate of transistor 118 is controlled by a switch control 116. A first input of a comparator 113 and a resistor 112 are connected to the source of transistor 118. On the other side, resistor 112 is connected to ground and to the second input of comparator 113. The cathode of diode 109 is connected on the one hand to resistor 110 and on the other hand, outside IC 100, to the internal resistance of the electrolytic capacitor ESR and to the anode of diode D of a peak rectifier 101. Resistor 101 is connected on its other side to a first input of an operational amplifier 114 and to a resistor 111. Resistor 111 is connected on the other side to ground. Resistors 110 and 111 thereby form a voltage divider. A reference voltage is applied to the second input of operational amplifier 114 so that a comparison of the voltage tapped by voltage divider 110 and 111 and that reference voltage takes place using operational amplifier 114. The output of operational amplifier 114 goes into a first input of a comparator 115. A sawtooth signal is applied to the second input of comparator 115. The output of comparator 115 goes into a first input of switch control 116. The output of comparator 113 is connected to a second input of switch control 116. Connected to a third input of switch control 116 is a signal line of microcontroller μC, or rather the control line, which, by virtue of serial or parallel communication between microcontroller and switching converter IC, transmits the logic command switching converter active or inactive to the switch control.

Internal resistance ESR is connected on its other side to capacitance ER of the energy reserve capacitor. Capacitance ER is connected on the other side to ground. The internal resistance of the electrolytic capacitor is not an electrical component but a modeling of the ohmic losses. The cathode of diode D is connected on the one hand to capacitance $C_{peak\_D}$ and to resistor R1 and to the parallel circuit composed of transistor 104 and the cathode of diode 106. Transistor 104 and cathode 106 belong to final stage IC 103 which activates firing pellet 108, transistor 104 and diode 106 being connected to firing element 108 on their other side. Transistor 104 is integrated in the circuit merely by its source and its drain. It acts here as a high-side switch. For the sake of simplicity, the connection of its gate is not shown here. Firing element 108 is connected on the other side to the low-side of final stage ASIC 103, more specifically to the drain of a transistor 105 and the cathode of diode 107 which is connected by the anode to ground and the drain of transistor 105. Resistor R1 belongs to voltage divider 102, resistor R1 being connected on its other side to resistor R2 and capacitor 109. Both capacitor 109 and resistor R2 are connected on the other side to ground.

Voltage converter 100 converts battery voltage VZP to a higher value to charge the capacitance ER to a value above the battery voltage. In that operation, voltage converter 100 operates in a clocked state, that is to say, in the charging state energy is built up in the coil by the increasing coil current up to $ISp_{max}$ in the transverse branch through switching transistor 118 of the converter in order to be dissipated again in the blocking phase of switching transistor 118 as a charging current pulse to the energy reserve capacitor ER. A so-called flyback converter is therefore obtained.

The clocking of voltage converter 100 is carried out by oscillator signal OSC which is fed to comparator 115. The signal is pulse-width modulated by the feedback loop formed by voltage divider 110 and 111 and operational amplifier 114 which compares the voltage tapped by voltage divider 110 and 111 with a reference value REF. Pulse-width modulation is thereby achieved. Feedback via comparator 113 is used to limit the coil current in the charging phase of the flyback converter to a maximum value. Diode 109 serves as a polarity inversion protection. Charging current $I_{SP}$ accordingly passes on the one hand via internal resistance ESR and capacitor ER and, on the other hand, via diode D, and thus charges the small capacitance $C_{peak\_D}$ to a voltage peak which may be tapped via resistor R1 and resistor R2.

Resistors R1 and R2 and also capacitor 109 and capacitance $C_{peak\_D}$ are dimensioned in such a manner that the charging current is fed predominantly to capacitor ER. High-side 104 is blocked and diode 106 is switched in such a manner that it blocks the charging current from converter 100. If voltage converter 100 is switched off and if $U_{ER}$>VZP, then, after a very short decay of the coil current, charging current no longer passes into capacitor ER and the voltage drop across internal resistance ESR does not occur. That drop is also exhibited by voltage 201 in FIG. 2, section 202 of the downstream peak rectifier.

Voltage 201=ux of the peak rectifier is divided by voltage divider 102 formed by R1 and R2 and is filtered by 109 in such a manner that it can be fed to an analog-digital converter of a microcontroller μC for voltage measurement.

The microcontroller is able to calculate the internal resistance (ESR) of the energy reserve capacitor from the observed drop in voltage at the peak rectifier and a knowledge of the max coil current if the microcontroller, on the other hand, is capable of influencing the operation of the flyback converter and has exact knowledge of the magnitude of the battery voltage $U_B$, (VZP) and of the energy reserve voltage.

Figure 2:
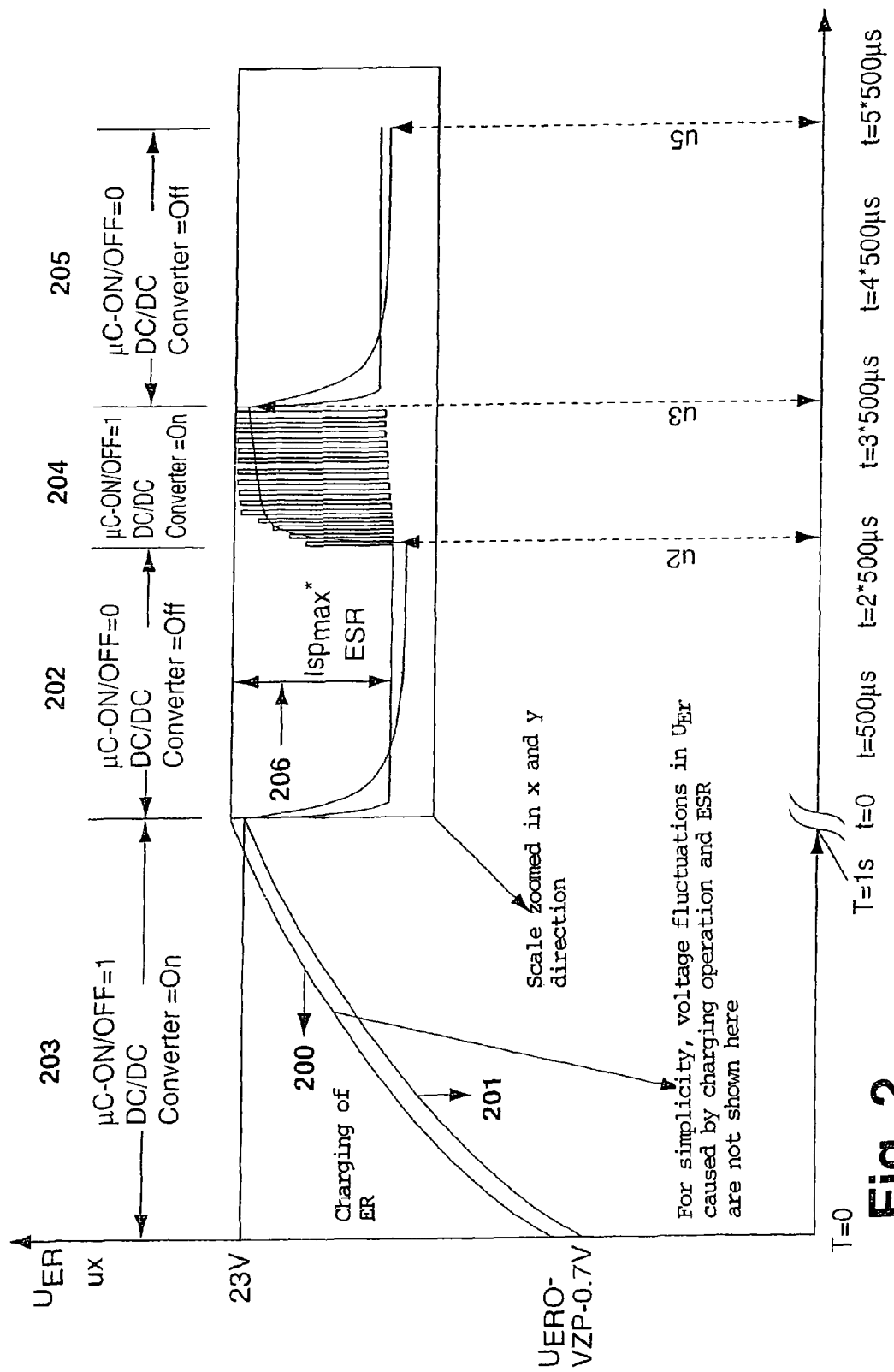
FIG. 2 is a voltage-time diagram of the charging and discharging operation of the energy reserve capacitor.

FIG. 2 illustrates the measuring method in a voltage-time diagram. Voltage 200=$U_{ER}$ (voltage at the energy reserve capacitor including the internal resistance with respect to ground) and 201=ux (output voltage of the peak rectifier with respect to ground) are plotted on the ordinate and time is plotted on the abscissa. In a first section 203, voltage converter 400 is switched on by microcontroller μC so that charging of capacitor ER to above battery voltage $U_B$ or VZP takes place. In time section 202, voltage converter 400 is then switched off by microcontroller μC. Owing to the small voltage level difference and to make rapid time processes clearer, the scale has been enlarged (zoomed) in the voltage and time direction. Since charging current is now no longer passing through resistance ESR, there is no voltage drop across that resistance. That does not, however, occur immediately but occurs with a certain delay owing to the decay of the coil current with regard to 200=$U_{ER}$ and the additional low-pass filtering in the peak rectifier with regard to 201=ux. A waiting period Toff is therefore observed until a static value is obtained. That value is designated u2 here with regard to 200=ux. A time of ±2·0.5 ms was estimated to be the time Toff here.

There then follows a phase 204 in which the voltage converter is switched on for the purposes of energy reserve ESR measurement. The clocked charging of capacitor ER is now clearly shown. That period in time section 204 is 0.5 ms long here. It has the result that the peak rectifier is charged to the value u3 while UER exceeds that value only in pulses by a diode voltage and a small increase in the voltage base value of the energy reserve capacitance. In FIG. 2, this is 201 and 200, respectively, in section 204.

Time section 204 is followed by time section 205 in which the voltage converter is switched off once more and the voltage u5 is obtained at the output of the peak rectifier after a waiting period of 2·0.5 ms after all time constants have decayed to ground.

The accordingly linearly divided voltages at the output of voltage divider 102 which are identified by upper-case U (u2→U2, u3→U3, u5→U5) are passed on to the ADC of the microcontroller for calculation of the internal resistance (ESR) of the energy reserve.

The voltage of the energy reserve is first increased by charging to a value that cannot be affected by $U_{Bat}$ (VZP), for example 23 volts, in order to be independent of the battery. Voltage converter 400 is then switched off and, after a waiting period Toff, the voltage at peak rectifier 401 is measured. The waiting period Toff is so selected that the energy in the converter coil has decayed and the undefined peak voltage of the peak rectifier has fallen to the static voltage UER-UD owing to the defined input current of the connected final stages and/or to the ohmic load of the voltage divider, and 4τ of a downstream low-pass filter have elapsed, τ being the time constant of the low-pass filter. Toff was selected to be, for example, 1 ms, which corresponds, for example, to two real-time frames of the microcontroller.

An estimation of Toff is given by Toff≈dt1+dt2+dt3:

converter coil $Lsp*Isp^2=C_{ER}*(u_{ER}^2-u_{ER0}^2)$, from which it follows that $du_{ER}$=3.1 mV where $C_{ER}$=2.2 mF, from which it follows that dt1=5.7 μs peak rectifier: $ESR_{max}*ISP_{max}*C_{peak\_D}$/IL=dt2=800 μs low-pass filter (formed by 102 and 109 in FIG. 1): 4τ=dt3=100 μs Selected Toff>=dt1+dt2+dt3=905.6 μs, Toff=2*0.5 ms Calculation parameters: IL=1.2 mA for the supply of the final stage IC at ER and the divider, and $ESR_{max}$=4Ω, $Isp_{max}$=1.2 A, $C_{peak\_D}$=200 nF, $u_{ER0}$=18 volts, $C_{ER}$=2.2 mF, Lsp=220 μH.

The voltage loss of the energy reserve in the time Toff due to customary static energy reserve load currents is then considered.

For an energy reserve of capacitance $C_{ER}$, the following voltage change is obtained for a load current IL in the time Toff:

$$du_{ERoff}=IL*Tw/C_{ER}.$$

When $C_{ER}$=2.2 mF, IL=1.2 mA, Tw=1 ms, then $$du_{ERoff}=1.2 \text{ mA}*1 \text{ ms}/2.2 \text{ mF}=0.55 \text{ mV}.$$

This shows that, for customary energy reserves of from 2.2 to 20 mF, $du_{ERoff}$ is negligibly small.

The equation for U2 is given below:

$$U2=Ux(t=Toff)=Ux(t=2*500 \text{ μs})=R \text{ div}*[u_{ER}(t=Toff)-U_D]=1449 \text{ mV}; \quad \text{Equ. 1}$$

calculation parameters:

$Rdiv = R1/R1+R2 = 0.0833;$ $U_D = 0.8 \text{ V};$ e.g. $u_{ER}(t = Toff) = U_{ER}(t=0) - Isp_{max} * ESR = 18.2 \text{ V}$ if $U_{ER}(t=0) = 23 \text{ V}$ at $Isp = Isp_{max},$ -continued $Isp_{max} = 1.2 \text{ A}$ and $ESR = ESR_{max} = 4 \Omega$ The converter is then switched on and operated for a time Ton. Ton was selected to be 500 μs here. Ton is selected in such a manner that the energy reserve voltage remains virtually unchanged, but the peak rectifier is increased to the value by an internal resistance of the energy reserve caused voltage drop.

The equation for U3 is given below:

$$U3=Ux(t=Toff+Ton)=Ux(3*500 \text{ μs})=R \text{ div}*[u_{ER}(t=Toff+Ton)+Isp_{max}*ESR-U_D] \quad \text{Equ. 2}$$

$$ESR=(U3-U2)/(R \text{ div}*Isp_{max}), \quad \text{Equ. 4}$$

being simplified as follows:

$$u_{ER}(t=Toff+Ton) \approx u_{ER}(t=Toff).$$

The inaccuracy of that simplification may be improved by the following methods:

the further charging of the energy reserve in the time Ton is first estimated $$du_{ERon} \approx [(Isp_{max}/3)*500 \text{ μs}]/C_{ERon}$$

where, for example, $Isp_{max}$=1.2 A, $C_{ERon}$=2200 μF gives $du_{ERon}$=90 mV.

That results in an improved determination of the internal resistance ESR. Consequently, Equation 4 is to be modified as follows:

$$ESR=(U3-d_{UERon}-U1)/(R \text{ div}*Isp_{max}) \quad \text{Equ. 5}$$

therein U1 is unknown.

The measurement is expanded by including the measured value u5.

After measurement of U3, the converter is switched off. The waiting period Toff is again observed until the peak value meter indicates the quasi-static voltage UER-UD again, then measurement is carried out, more specifically of u5 or U5. Equation 5 may thereby be expressed without the unknown as follows:

$$ESR=(U3-(U5-U1)-U1)/(R \text{ div}*Isp_{max})=(U3-U5)/(R \text{ div}*Isp_{max}) \quad \text{Equ. 6}$$

The following remain as tolerances for determining the internal resistance aa) the tolerance of the voltage measurement, which is substantially provided only by the voltage divider. The reference voltage of the analog-digital converter is not included owing to the rapid measuring sequence if it is sufficiently filtered.

bb) a ±1 bit tolerance of the analog-digital converter corresponds in the case of a 10 bit analog-digital converter having a reference voltage of 3.3 V based on the measurement voltage Ux to a value of 38.76 mV cc) the tolerance of the maximum coil current $Isp_{max}$. The latter may simply be kept at ±33% by suitable design of the switching regulator, or may be given maximum accuracy, for example 3%, by levelling, for example via a reference resistor.

The peak rectifier formed by diode D and capacitance $C_{peak\_D}$ are components for the determination of the internal resistance of the energy reserve by the method described above. The components are, however, generally already a component part of an airbag control unit to enable polarity inversion protection of the firing circuits against the energy reserve in the event of short-circuit to $U_{Bat}$.

Figure 3:
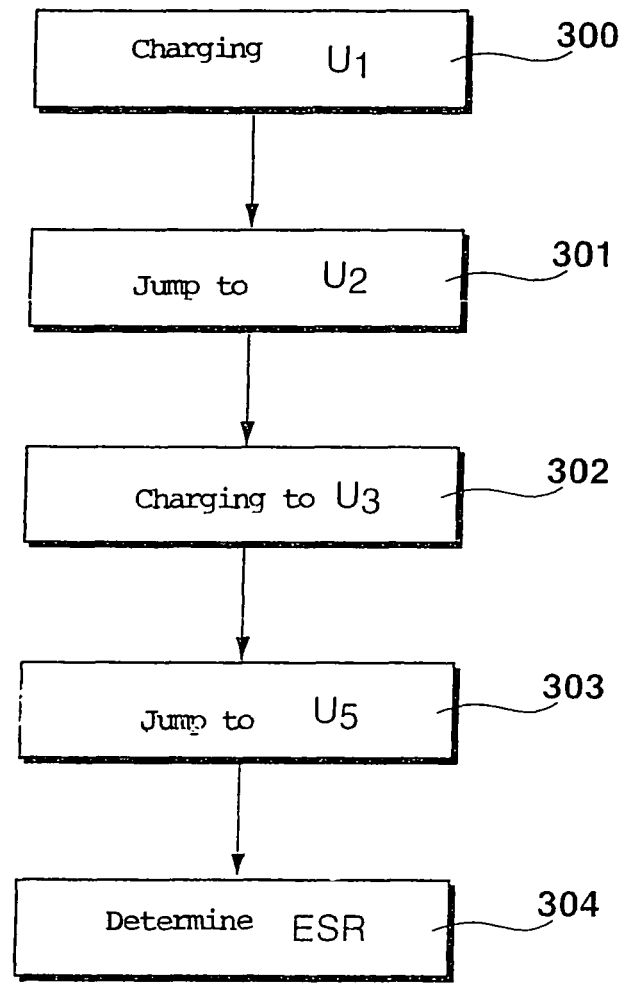
FIG. 3 is a flow chart of the method according to an example embodiment of the present invention.

FIG. 3 is a flow chart showing the method according to the present invention. In method step 300, charging is carried out to the above-mentioned value of, for example, $U_{ER}$=23 volts ($\approx u_{ER}$ if ESR$\approx$0). Selected $u_{ER} > U_{Bmax}$.

At the ADC of the microcontroller, ux attains the value U1. In method step 301, the converter is switched off and the current falls to zero, with the result that the voltage drops to U2. In method step 302, charging operation of ER takes place again, the voltage at peak rectifier 101,401 being charged to u3, or U3 at the ADC input, in order for the converter to be switched off again in method step 303, with the result that once more a drop to U5 occurs. It is then possible in method step 304 for the internal resistance of the energy reserve capacitor to be determined from the voltage differences taking into consideration the other electrical parameters.

Figure 5:
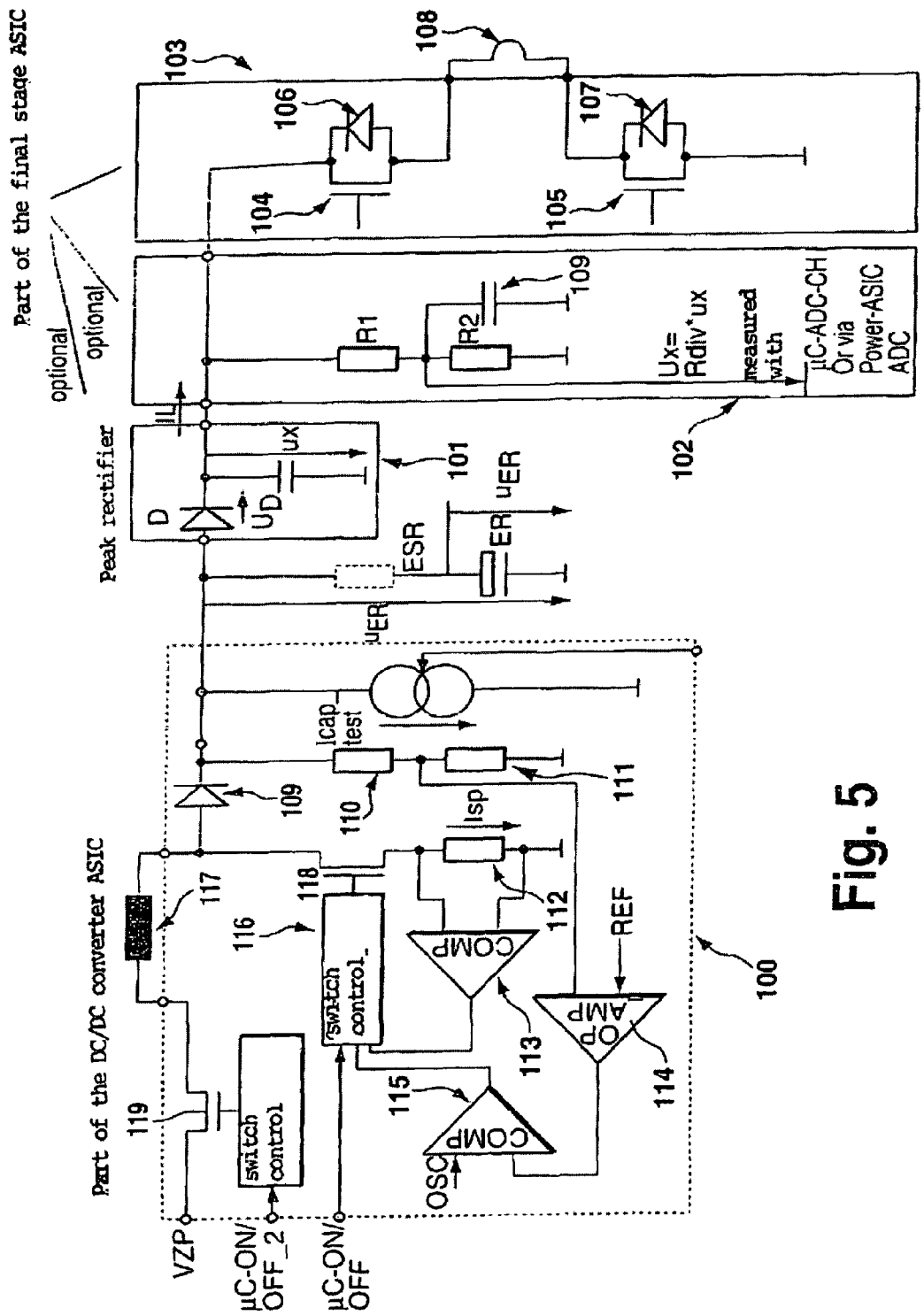
FIG. 5 is a second circuit diagram of the device according to an example embodiment of the present invention.

FIG. 5 shows a further exemplary embodiment of a combined ESR and capacitance measurement of a central energy reserve.

For this, FIG. 1 is expanded by a further series transistor 119. Series transistor 119 is connected by one outer electrode to battery voltage VZP and by the other outer electrode to coil 117. The middle electrode is connected to a switch control 120. Switch control 120 is controlled by microcontroller μC. Compared with FIG. 1, therefore, series transistor 119 has been inserted in the connection line between VZP and coil 117. Otherwise, all components and connections are the same.

The passage of battery voltage to the energy reserve may be controlled by the μC using that transistor 119.

If transistor 119 is switched off, it is also not possible for the energy reserve to be pre-charged by UB (VZP).

If transistor 119 is switched on, the ER is pre-charged to UB (VZP).

Thereafter, the energy reserve may be discharged slightly by the added current source without interference by UB at low ER voltage for capacitance measurement. The capacitance of ER may be calculated from Icap_test, the selected discharging time and the observed voltage level difference at ER.

Advantages of that exemplary embodiment are μC-controlled pre-charging of ER to UB (VZP).

An ER capacitance test at low ER voltage results in a reduction in the power loss in the measuring current source for capacitance measurement.

With the series transistor blocked, the ER capacitance measurement and ESR measurement may be carried out without interference by transients on the supply line, since the passage of UB (VZP) is prevented during the measurements.

The μC control lines μC-ON/OFF, μC-ON/OFF_2, μC-ON/OFF_3, apart from being directly connected to the μC, may also be controlled from a logic element present in the ASIC, that logic element communicating with the μC via a serial or parallel interface in order to receive the commands and acknowledge execution thereof.

What is claimed is:

1. A device for monitoring at least one energy reserve capacitor in a restraint system, comprising:
a microcontroller configured to monitor a capacitance of the at least one energy reserve capacitor;
a voltage converter configured to convert an input voltage to a higher output voltage and charge the at least one energy reserve capacitor using the higher output voltage; and
a rectifier and a voltage divider configured to determine a charging current and a difference between at least one observed peak voltage value and at least one subsequently observed static voltage value, the at least one peak voltage value being a result of an active phase of the voltage converter and the at least one static voltage value being a result of an inactive phase of the voltage converter following the active phase of the voltage converter, a waiting period following the at least one observed peak voltage value,
wherein the microcontroller generates a signal to selectively shut the voltage converter off to provide defined starting conditions, and
wherein the voltage converter, the rectifier, and the voltage divider are configured to monitor an ohmic internal resistance of the at least one energy reserve capacitor.

2. The device as recited in claim 1, wherein the rectifier and the voltage divider are configured to determine the internal resistance by a time sequence of at least one charging operation and an interruption of the charging operation of the energy reserve capacitor.

3. The device as recited in claim 1, wherein the voltage converter has a regulator to regulate the output voltage of the voltage converter.

4. The device as recited in claim 1, wherein the rectifier is a peak rectifier.

5. The device as recited in claim 1, wherein the voltage divider is configured as a low-pass filter.

6. The device as recited in claim 3, wherein a series transistor that controls passage of a battery voltage to the energy reserve capacitor is provided in the voltage converter.

7. A method for monitoring at least one energy reserve capacitor in a restraint system, comprising:
selectively turning off a voltage converter by a signal generated by a microcontroller to provide defined starting conditions, wherein the voltage converter is configured to convert an input voltage to a higher output voltage and charge the at least one energy reserve capacitor using the higher output voltage;
monitoring a capacitance of the at least one energy reserve capacitor;
determining a charging current on the at least one energy reserve capacitor; and
monitoring an internal resistance of the at least one energy reserve capacitor by determining a difference between at least one observed peak voltage value and at least one static voltage value observed after a waiting period following the at least one observed peak voltage value,
wherein the at least one peak voltage value is a result of a charging phase of the energy reserve capacitor and the at least one static voltage value is a result of a discharging phase of the energy reserve capacitor following the charging phase of the energy reserve capacitor.

8. The method as recited in claim 7, wherein the monitoring of the internal resistance includes determining the internal resistance by a time sequence of at least one charging operation and an interruption of the charging operation.

9. The method as recited in claim 7, wherein the internal resistance is monitored by, in a first step, charging the energy reserve capacitor to a first voltage value, in a second step interrupting the charging operation for a first period, in a third step charging the energy reserve capacitor again for a second period until a peak value meter is charged to a second voltage value, in a fourth step interrupting the charging operation for a third period with a result that a voltage at the peak rectifier drops to a third voltage value, and in a fifth step determining the internal resistance from the voltage difference between the second voltage and the third voltage value.

10. The method as recited in claim 9, wherein the first voltage value is above a vehicle battery voltage.

11. The method as recited in claim 9, wherein the charging is carried out in a clocked manner.

12. The method as recited in claim 9, wherein the first period is selected in dependence on a time constant of a low-pass filter connected downstream of the energy reserve capacitor and on a voltage reduction of a rectifier connected downstream of the energy reserve capacitor.

13. The method as recited in claim 12, wherein the second period is selected so that the voltage at the rectifier is increased to the second voltage value.

14. The method as recited in claim 9, wherein the third period is equal to the first period.

\* \* \* \* \*